US009389392B2

(12) United States Patent
Morimoto

(10) Patent No.: US 9,389,392 B2
(45) Date of Patent: Jul. 12, 2016

(54) IMAGING APPARATUS, CONTROL METHOD FOR THE IMAGING APPARATUS, LENS UNIT, AND CONTROL METHOD FOR THE LENS UNIT

(75) Inventor: Yosuke Morimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 13/485,006

(22) Filed: May 31, 2012

(65) Prior Publication Data
US 2012/0307134 A1 Dec. 6, 2012

(30) Foreign Application Priority Data

Jun. 6, 2011 (JP) .................................. 2011-126538

(51) Int. Cl.
| G02B 7/10 | (2006.01) |
| G02B 26/02 | (2006.01) |
| H04N 5/225 | (2006.01) |
| H04N 5/232 | (2006.01) |
| G03B 11/00 | (2006.01) |
| G03B 13/36 | (2006.01) |
| G03B 17/14 | (2006.01) |

(52) U.S. Cl.
CPC .............. *G02B 7/102* (2013.01); *G02B 26/023* (2013.01); *G03B 11/00* (2013.01); *G03B 13/36* (2013.01); *G03B 17/14* (2013.01); *H04N 5/2254* (2013.01); *H04N 5/23209* (2013.01); G03B 2206/00 (2013.01)

(58) Field of Classification Search
CPC ............ H04N 5/2254; H04N 5/23209; H04N 5/2352; H04N 5/23212

USPC .......................................................... 348/360
See application file for complete search history.

(56) References Cited

U.S. PATENT DOCUMENTS

| 6,608,651 | B2* | 8/2003 | Mabuchi et al. ............... 348/335 |
| 6,924,941 | B2* | 8/2005 | Okada et al. .................. 359/698 |
| 2002/0047912 | A1 | 4/2002 | Mabuchi |
| 2003/0161049 | A1 | 8/2003 | Okada |
| 2005/0128339 | A1 | 6/2005 | Masuda |
| 2007/0189730 | A1* | 8/2007 | Okamura ....................... 386/107 |

FOREIGN PATENT DOCUMENTS

| CN | 101295122 A | 10/2008 |
| JP | H02-207229 A | 8/1990 |
| JP | 2003-241075 A | 8/2003 |

(Continued)

*Primary Examiner* — Twyler Haskins
*Assistant Examiner* — Padma Haliyur
(74) *Attorney, Agent, or Firm* — Canon U.S.A., Inc. IP Division

(57) ABSTRACT

An imaging apparatus on which a lens unit having a photographic optical system including a focus lens and capable of controlling driving of the photographic optical system based on information received from the imaging apparatus is mountable includes a filter driving unit configured to insert or retract an optical filter on an optical path of the photographic optical system, a detection unit configured to detect an insertion state of the optical filter, and a control unit configured to calculate, based on a change of the insertion state of the optical filter detected by the detection unit, a movement amount of an image forming position of an object image, and to transmit information on the movement amount of the image forming position of the object image and information indicating the insertion state of the optical filter to the lens unit.

15 Claims, 7 Drawing Sheets

(56) References Cited

FOREIGN PATENT DOCUMENTS

| JP | 2003-241078 A | 8/2003 |
|---|---|---|
| JP | 2004-129124 A | 4/2004 |
| JP | 2005-128566 A | 5/2005 |
| JP | 2005-173267 A | 6/2005 |
| JP | 2005-242105 A | 9/2005 |
| JP | 2006-003460 A | 1/2006 |
| JP | 2010-049001 A | 3/2010 |
| JP | 2011-075647 A | 4/2011 |

* cited by examiner

IMAGING APPARATUS, CONTROL METHOD FOR THE IMAGING APPARATUS, LENS UNIT, AND CONTROL METHOD FOR THE LENS UNIT

BACKGROUND OF THE INVENTION

1. Field of the Invention

The present invention relates to an interchangeable-lens type imaging apparatus and a lens unit mountable on the imaging apparatus.

2. Description of the Related Art

Some recent interchangeable-lens type cameras, represented by single-lens reflex cameras, are equipped with not only a still image capturing function but also a moving image capturing function. This function enables various moving image expressions by interchanging lenses, which have not been achieved by a conventional lens-integrated type video camera.

Exposure in the imaging apparatus is generally adjusted by combining adjustments of a diaphragm and a shutter speed. However, when the exposure is adjusted by increasing the shutter speed in the case of high object luminance, flickering of an image becomes conspicuous during moving image capturing, thus causing a reduction of moving image quality. Particularly, in the interchangeable-lens type camera, which is characterized by an image expression where the diaphragm is opened to decrease a depth of field and to blur a background, the shutter speed is required to be increased more when the diaphragm is opened, consequently making an image quality reduction conspicuous.

Under such a shooting condition, an effective way to carry out photographing is to attach a neutral density (ND) filter to a lens to decrease a light amount by the filter, thus preventing an increase of the shutter speed. However, it is bothersome to carry the ND filter separately from the imaging apparatus and attach the filter according to a shooting condition in each case. It is, therefore, convenient that a detachable ND filer is built in an optical path of a camera body.

Conventionally, lens-integrated type video cameras generally have an ND filter built-in. However, when an optical member such as an ND Filter is inserted into or retracted from a photographic optical system, a focus position of the photographic optical system shifts due to a difference in refractive index between optical members or a thickness of the member. Thus, Japanese Patent Application Laid-Open No. 2003-241078 discusses a lens-integrated type video camera that detects an insertion state of an ND filter and corrects defocusing by driving a focus control lens (focus lens) according to the insertion state.

In the case of lens-integrated type video cameras, such as that discussed in Japanese Patent Application Laid-Open No. 2003-241078, a thickness of the filter and optical characteristics of the lens are known beforehand. Thus, defocusing can accordingly be corrected by storing a correction amount of the focus lens position according to the insertion state of the ND filter in a camera body beforehand.

However, in the case of interchangeable-lens type cameras, since various types of lens units different in optical characteristics may be attached to a camera body, it is difficult to store the correction amount of the focus lens position in the camera body beforehand. Similarly, a lens unit may be attached to various types of camera bodies having different filters, and hence, it is difficult to store the correction amount in the lens unit beforehand. Consequently, in the interchangeable-lens type cameras, defocusing caused by insertion or retraction of the ND filter cannot be corrected, unlike the case of lens-integrated type video cameras. This issue becomes conspicuous when a moving image is captured with a general rear focus type lens mounted as a lens configuration of a zoom lens of the video camera, as described below.

In the case of the rear focus type lens, an in-focus state during zooming is maintained by controlling a magnification variation lens (zoom lens) and a focus lens in association with each other so as to satisfy a predetermined positional relationship (an electronic cam locus) based on an object distance. However, when the ND filer is inserted to cause a change in the focus position, the positional relationship between the zoom lens and the focus lens defined by the electronic cam locus shifts, thus disabling maintenance of the in-focus state during zooming. In the case of capturing a moving image, an image captured during zooming is also recorded. As a result, unless a change in the focus position caused by the insertion of the ND filter can be corrected, an out-of-focus image may be recorded during zooming.

SUMMARY OF THE INVENTION

The present invention is directed to an interchangeable-lens type camera that is capable of correcting defocusing caused by insertion or retraction of an ND filter built in a camera body, and capturing a good in-focus image during photographing including moving image capturing.

According to an aspect of the present invention, an imaging apparatus on which a lens unit having a photographic optical system including a focus lens and capable of controlling driving of the photographic optical system based on information received from the imaging apparatus is mountable, includes: a filter driving unit configured to insert or retract an optical filter on an optical path of the photographic optical system; a detection unit configured to detect an insertion state of the optical filter; and a control unit configured to calculate, based on a change of the insertion state of the optical filter detected by the detection unit, a movement amount of an image forming position of an object image, and to transmit information on the movement amount of the image forming position of the object image and information indicating the insertion state of the optical filter to the lens unit.

According to another aspect of the present invention, a lens unit mountable on an imaging apparatus capable of inserting or retracting an optical filter includes: a photographic optical system including a focus lens; a storage unit configured to previously store first information regarding a relationship between a movement amount of the focus lens and a movement amount of an image forming position of an object image for each position of the focus lens; and a control unit configured to receive information indicating an insertion state of the optical filter and information on the movement amount of the image forming position of the object image from the imaging apparatus, and to determine the movement amount of the focus lens based on the received information and the first information corresponding to the position of the focus lens to control driving of the focus lens.

According to yet another aspect of the present invention, a lens unit mountable on an imaging apparatus capable of inserting or retracting an optical filter includes: a photographic optical system including a focus lens and a zoom lens; a storage unit configured to previously store first information regarding a relationship between a movement amount of the focus lens and a movement amount of an image forming position of an object image for each position of the focus lens and each position of the zoom lens; and a control unit configured to receive information indicating an insertion state of the optical filter and information on the movement amount of the image forming position of the object image from the imaging apparatus, and to determine the movement amount of the focus lens based on the received information and the first information corresponding to the position of the focus lens and the position of the zoom lens to control driving of the focus lens.

According to yet another aspect of the present invention, there is provided a method for controlling an imaging apparatus on which a lens unit having a photographic optical system including a focus lens and capable of controlling driving of the photographic optical system based on information received from the imaging apparatus is mountable. The method includes: inserting or retracting an optical filter on an optical path of the photographic optical system; detecting an insertion state of the optical filter; and calculating a movement amount of an image forming position of an object image based on a change of the detected insertion state, and transmitting information on the movement amount of the image forming position of the object image and information indicating the insertion state of the optical filter to the lens unit.

According to yet another aspect of the present invention, there is provided a method for controlling a lens unit that is mountable on an imaging apparatus capable of inserting or retracting an optical filter and includes a photographic optical system including a focus lens and a storage unit configured to previously store first information regarding a relationship between a movement amount of the focus lens and a movement amount of an image forming position of an object image for each position of the focus lens. The method includes: receiving information indicating an insertion state of the optical filter and information on the movement amount of the image forming position of the object image from the imaging apparatus; and determining the movement amount of the focus lens based on the received information and the first information corresponding to the position of the focus lens to control driving of the focus lens.

According to yet another aspect of the present invention, there is provided a method for controlling a lens unit that is mountable on an imaging apparatus capable of inserting or retracting an optical filter and includes a photographic optical system including a focus lens and a zoom lens, and a storage unit configured to previously store first information regarding a relationship between a movement amount of the focus lens and a movement amount of an image forming position of an object image for each position of the focus lens and each position of the zoom lens. The method includes: receiving information indicating an insertion state of the optical filter and information on the movement amount of the image forming position of the object image from the imaging apparatus; and determining the movement amount of the focus lens based on the received information and the first information corresponding to the position of the focus lens and the position of the zoom lens to control driving of the focus lens.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will herein be described in detail below with reference to the drawings.

Figure 1:
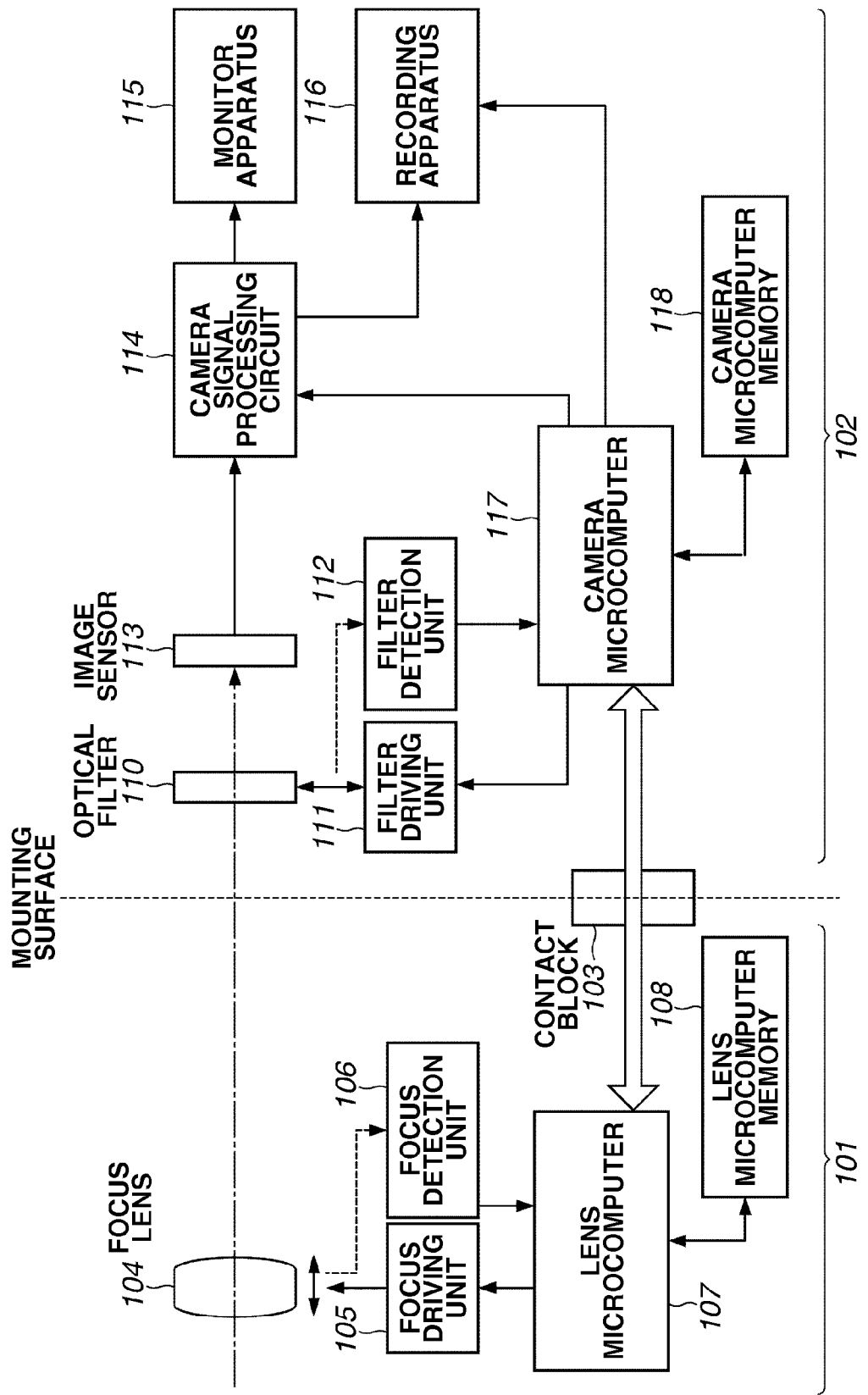
FIG. 1 is a block diagram illustrating an example configuration of an imaging apparatus according to a first exemplary embodiment of the present invention.

FIG. 1 is a block diagram illustrating a configuration of an interchangeable-lens type camera (imaging apparatus) according to a first exemplary embodiment of the present invention.

A lens unit 101 and a camera body 102 are configured to communicate data with each other via a contact block 103 located on a mounting surface. The data communication can be carried out at a predetermined period (e.g., generation period of a vertical synchronization signal in a video signal) or inperiodically by transmitting a communication request from one of the lens unit 101 and the camera body 102 to the other. The communicated data is transmitted or received between a lens microcomputer 107 and a camera microcomputer 117 described below to be used for controlling the lens unit 101 and the camera body 102. From the lens microcomputer 107 to the camera microcomputer 117, for example, position data of the lens or data indicating a lens control state is transmitted. Conversely, from the camera microcomputer 117 to the lens microcomputer 107, in addition to a control command for the lens or a diaphragm (not illustrated), information regarding focus correction during insertion or retraction of an ND filter is transmitted.

First, components of the lens unit 101 are described. A focus lens 104, which adjusts a focus, is driven in an optical axis direction (the horizontal direction illustrated) by a focus driving unit 105. The focus driving unit 105, for which a stepping motor or a direct-operated voice coil motor is used, is controlled by a driving control command from the lens microcomputer 107. A focus detection unit 106 is a sensor for detecting a focus lens position, and a detected signal is input to the lens microcomputer 107 to be used for controlling driving of the focus lens 105. If a stepping motor is used for the driving unit, the position can also be detected by counting, by the lens microcomputer 107, the number of driving pulses to drive the stepping motor. Thus, the focus detection unit 106 may be omitted. A photographic optical system of the lens unit, which generally includes a plurality of lenses including the focus lens and a diaphragm, is not illustrated.

The lens microcomputer 107, which controls the lens unit 101, controls communication with the camera body and the driving of the focus lens 104 as described above, and calculates a focus correction amount during the insertion or retraction of the ND filter. A lens microcomputer memory 108, which is a storage unit including a dynamic random access memory (DRAM) or a flash read-only memory (ROM), stores a program of processing executed by the lens microcomputer 107 or data used for the processing. Data relating to the sensitivity of the focus lens 104 is also stored in this memory.

Next, components of the camera body 102 are described. An optical filter 110 is an ND filter. A single ND filter may be used, but a plurality of ND filters can be switched to be used. A light amount can be adjusted by gradually changing an insertion amount of the filter. Hereinafter, it is assumed that the optical filter 110 is an ND filter. However, an infrared cut filter for cutting an infrared light component can be used. In a general imaging apparatus, the infrared cut filter is inserted into a photographic optical system to remove an infrared light component. However, there has been proposed a camera that enables retraction of such an infrared cut filter from an optical path in a special shooting condition such as shooting in the dark. In this case, defocusing occurs as in the case of the ND filter. The present invention can be applied to correction of defocusing in this case.

A filter driving unit 111 includes a motor that serves as a driving source to insert or retract the ND filter 110 into or from the optical path of the photographic optical system. The filter driving unit 111, which is controlled by the camera microcomputer 117 described below, drives insertion or retraction of the ND filter on the optical path according to a shooting condition or an operator's setting operation. In place of the filter driving unit 111, a lever for manually inserting or retracting the ND filter 110 on the optical path can be provided. The operator can insert or retract the ND filter by manually operating the lever. A filter detection unit 112 is a sensor for detecting an insertion state (filter position) of the ND filter 110. A detected signal is input to the camera microcomputer 107 to be used for detecting the insertion state of the ND filter. In the case of a configuration where a plurality of ND filters are switched to be used, an insertion state including which of the filters has been inserted is detected. In the case of a configuration where the light amount is adjusted by gradually changing an insertion amount of the filter, the insertion amount of the filter is detected. When a stepping motor is used for the filter driving unit, the insertion state can also be detected by counting, by the camera microcomputer 117, the number of pulses to drive the stepping motor. Thus, the filter detection unit 112 may be omitted.

An image sensor 113 is a charge-coupled device (CCD) sensor or a complementary metal-oxide semiconductor (CMOS) sensor. A camera signal processing circuit 114 executes various image processes for a signal output from the image sensor 113. A monitor apparatus 115 is a display unit that displays an output signal of the camera signal processing circuit 114 to be used by the operator to monitor an image, and a camera state or various warnings to the operator. A recording apparatus 116 records a video signal generated by the camera signal processing circuit 114 on a recording medium such as a semiconductor memory.

The camera microcomputer 117, which controls the operation of the camera body 102, communicates with the lens unit 101 and calculates the image plane movement amount during the insertion or retraction of the ND filter as described above. A camera microcomputer memory 118, which is a storage unit including a DRAM or a flash ROM, stores a program of processing executed by the camera microcomputer 117 or data used for the processing. The camera microcomputer memory 118 also stores data relating to the image plane movement amount during the insertion or retraction of the ND filter.

Next, correction processing of defocusing caused by the insertion or retraction of the ND filter according to the present exemplary embodiment is described. First, processing in the camera body 102 is described referring to the flowchart of FIG. 2. The processing below is executed by the camera microcomputer 117.

Figure 2:
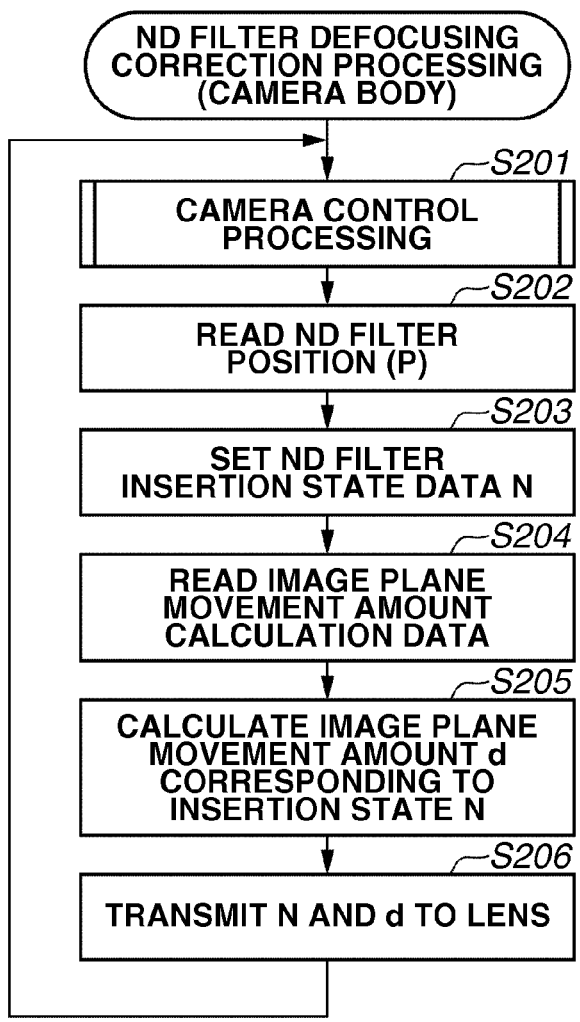
FIG. 2 is a flowchart illustrating an example defocusing correction processing in a camera body according to the first exemplary embodiment.

In FIG. 2, in step S201, the camera microcomputer 117 executes camera control processing such as video signal processing, a photographing operation, or various setting operations at the camera. Detailed description of this processing is omitted. In step S202, the camera microcomputer 117 reads data P of the filter position detected by the filter detection unit 112.

In step S203, the camera microcomputer 117 sets communication data N indicating a filter insertion state from the filter position data P. In the data N, filter insertion and retraction can be expressed by "1" and "0", respectively. In the case of a configuration including a plurality of filters or a configuration where a filter insertion amount is gradually changed, corresponding insertion states can be expressed by "0", "1", "2", . . . . The data N is used for determining a change in filter insertion state by the lens unit 101 as described below. As described below, depending on whether an image plane movement amount "d" transmitted from the camera body 102 to the lens unit 101 has changed, the change in filter insertion state can be determined by the lens unit 101. Thus, the correction processing in the present exemplary embodiment can be executed even in the case of a configuration where the data N of the filter insertion state is not transmitted to the lens microcomputer 107.

Then, in step S204, the camera microcomputer 117 reads, from the camera microcomputer memory 118, data to calculate an image plane movement amount during filter insertion. In step S205, the camera microcomputer 117 calculates the image plane movement amount "d" corresponding to the filter insertion state N. The image plane movement amount "d" indicates a shifting amount of a focus position of the photographic optical system in the case of the filter insertion state N with respect to an image plane position of a reference state such as a filter retracted state. However, since the image plane movement amount changes depending on an optical system of a lens or a position of a movable lens such as a focus lens, the image plane movement amount "d" takes a value with respect to a reference lens position (e.g., an infinite in-focus position) of a reference lens. The change depending on the optical system of the lens or the lens position is converted on the lens microcomputer side as described below. When the camera body is configured to switch insertion or retraction of a plurality of filters, data of an image plane movement amount corresponding to each filter insertion is stored, and an image plane movement amount is determined according to an inserted filter. In the case of a configuration where the filter insertion amount is gradually changed, a plurality of pieces of data relating to combinations of insertion amounts (filter positions) and image plane movement amounts are stored for a plurality of positions, and image plane movement amounts corresponding to filter insertion amounts are calculated from the plurality of pieces of data by interpolation.

In step S206, the camera microcomputer 117 transmits the filer insertion state N and the image plane movement amount "d", determined through the above-described processing, to the lens microcomputer 107. Then, the processing returns to step S201 to be repeated.

Figure 3:
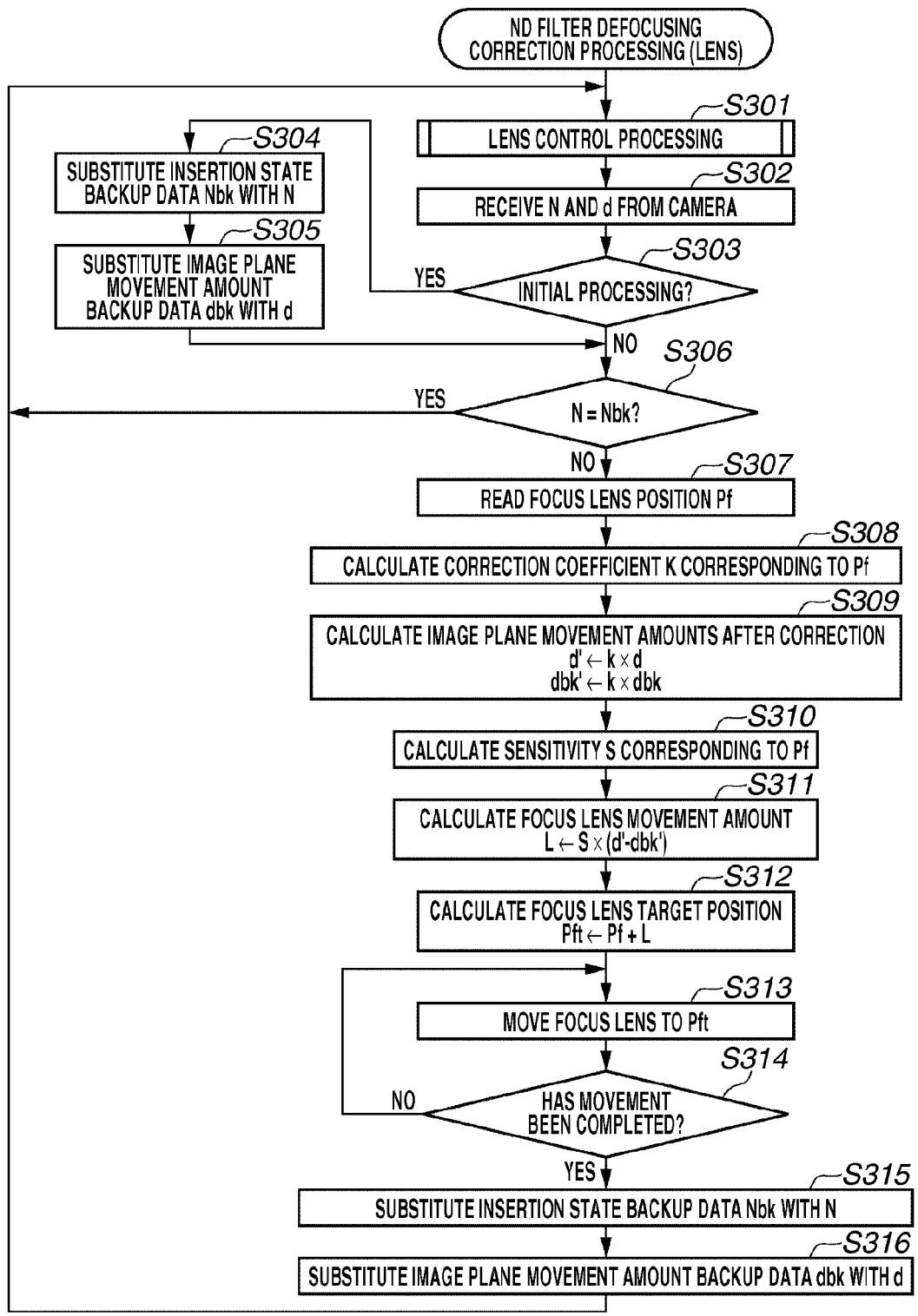
FIG. 3 is a flowchart illustrating an example defocusing correction processing in a lens unit according to the first exemplary embodiment.

Next, processing at the lens unit 101 is described referring to the flowchart of FIG. 3. The processing is executed by the lens microcomputer 107.

In FIG. 3, in step S301, the lens microcomputer 107 executes overall control of the lens such as diaphragm control. Detailed description of the processing is omitted. Then, in step S302, the lens microcomputer 107 receives the filter insertion state N and the image plane movement amount "d" transmitted from the camera body 102. When the data reception has previously been executed, in step S302, the lens microcomputer 107 reads the data N and "d" from a memory that has stored the received data.

Then, in step S303, the lens microcomputer 107 determines whether the processing illustrated in FIG. 3 is executed for the first time, for example, immediately after the start-up. When it is initial processing (YES in step S303), the processing proceeds to steps S304 and S305, in which the lens microcomputer 107 substitutes backup data Nbk and dbk of the filter insertion state N and the image plane movement amount "d" respectively with the received data N and "d". The backup data Nbk and dbk are normally substituted in steps S315 and S316 as described below. However, the backup data Nbk and dbk are substituted with the data N and "d" as initial values in steps S304 and S305, because they are yet to be processed at the time of initial processing. When it is determined not to be initial processing (NO in step S303), the processing proceeds to step S306.

In step S306, the lens microcomputer 107 determines whether the filter insertion state N is equal to the backup data Nbk. When equal (YES in step S306), there has been no change in filter insertion state, and hence the processing returns to step S301 without correcting defocusing. On the other hand, when not equal (NO in step S306), there has been a change in filter insertion state, and hence the processing proceeds to step S307 to correct defocusing. When the data N of the filter insertion state is not transmitted from the camera body 102 as described above, similar correction processing can be carried out by determining whether the image plane movement amount "d" is equal to the backup data dbk or whether a difference therebetween is equal to or less than a threshold value. The threshold value can be determined based on how much defocusing is permitted for performance of the imaging apparatus (e.g., defocusing within a depth of field that is a limit of recognizing defocusing of a captured image).

Figure 7:
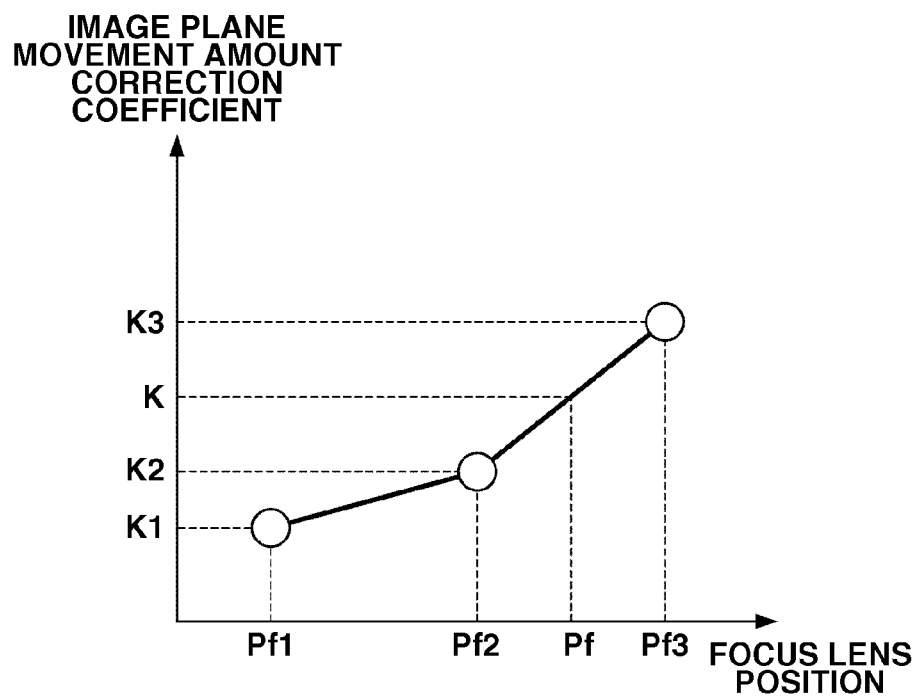
FIG. 7 illustrates an example of a relationship between a focus lens position and an image plane movement amount correction coefficient.

In step S307, the lens microcomputer 107 reads a focus lens position Pf detected by the focus detection unit 106. Then, in step S308, the lens microcomputer 107 calculates a correction coefficient K for the image plane movement amount "d" received from the camera microcomputer 117. As described above, while the image plane movement amount "d" takes a value with respect to the reference lens position of the reference lens, a real image plane movement amount changes depending on the optical system of the lens or the focus lens position. Thus, the image plane movement amount "d" is converted into a real image plane movement amount "d'" by the calculated correction coefficient K. FIG. 7 illustrates an example of a relationship between the focus lens position and the image plane movement amount correction coefficient. This relationship is determined by optical characteristics of the lens. Thus, as data to calculate the correction coefficient K corresponding to the focus lens position, for example, values of focus lens positions Pf1, Pf2, and Pf3 and values K1, K2, and K3 of corresponding correction coefficients are stored in the lens microcomputer memory 108. The correction coefficient K corresponding to the focus lens position detected in step S307 can be calculated by linearly interpolating the values of the correction coefficients K2 and K3 if the focus lens position Pf is between Pf2 and Pf3 as illustrated. The number of divisions of Pf1, Pf2, . . . stored in the lens microcomputer memory 108 can be determined so that defocusing caused by an approximation error in straight-line approximation can be within a permissible range. When the lens unit includes another movable lens such as a zoom lens, in step S308, the lens microcomputer 107 calculates a conversion coefficient K corresponding to not only the focus lens position but also the position of such a lens.

In step S309, the lens microcomputer 107 multiplies the image plane movement amount "d" and the backup data dbk received from the camera microcomputer 117 by the correction coefficient K calculated in step S308 to calculate image plane movement amounts "d'" and dbk' after correction.

Then, in step S310, the lens microcomputer 107 calculates a sensitivity S corresponding to the focus lens position Pf. The sensitivity S, which is a coefficient indicating a ratio of a movement amount of the focus lens and a movement amount of the image plane, is calculated by S=d/L, where L is a focus lens movement amount, and "d" is an image plane movement amount. The sensitivity S is determined by the optical characteristics of the lens. Thus, as in the case of the conversion coefficient K of the image plane movement amount, data to calculate the sensitivity S corresponding to the focus lens position is stored beforehand in the lens microcomputer memory 108, and the sensitivity S corresponding to the focus lens position Pf is calculated by interpolation. When the lens unit includes another movable lens such as a zoom lens, in step S310, the lens microcomputer 107 calculates the sensitivity S corresponding to not only the focus lens position but also the positions of such a lens.

In step S311, the lens microcomputer 107 calculates a movement amount L of the focus lens to correct defocusing due to a change in filter insertion state. The change of the filter insertion state is accompanied by a change of the image plane movement amount from dbk' to "d'", and hence a focus lens movement amount to correct this change can be calculated by L=S×(d'−dbk').

Then, in step S312, the lens microcomputer 107 calculates a movement target position Pft to move the focus lens 104. The target position is represented by Pft=Pf+L, where L is a movement amount to correct defocusing with respect to a current focus lens position Pf. In step S313, the lens microcomputer 107 drives the focus driving unit 105 to move the focus lens to the target position Pft. In step S314, the lens microcomputer 107 determines whether the focus lens has reached the target position Pft. When it is determined that the focus lens has not reached the target position Pft (NO in step S314), the processing returns to step S313 to continue the driving. When the focus lens has reached the target position Pft (YES in step S314), the processing proceeds to step S315. In steps S315 and S316, for processing next time, the lens microcomputer 107 substitutes the backup data Nbk and dbk of the filter insertion state N and the image plane movement amount "d" with the received data N and "d". This completes the correction processing of the defocusing. Then, the processing returns to step S301 to be repeated.

As described above, when the data N of the filter insertion state is not transmitted from the camera body 102, steps S304 and S315 may be omitted.

In a general camera, the operator can select an autofocus mode of automatically focusing the camera or a manual focus mode of manually focusing the camera to use it. In the case of the autofocus mode, even when insertion or retraction of the ND filter causes defocusing, since a focusing operation is automatically executed, the correction processing of defocusing can be carried out only in a case where the camera is in the manual focus mode. However, in the focusing operation of the autofocus mode, it takes time to determine a focus lens position for focusing, and hence the defocusing can be corrected within a shorter time by executing the defocusing correction processing even in the autofocus mode.

According to the first exemplary embodiment of the present invention, in the interchangeable-lens type camera, the camera microcomputer transmits the information on the insertion state of the optical filter such as an ND filter included in the camera body and the image plane movement amount of the optical system during the insertion of the filter to the lens microcomputer. The lens microcomputer calculates, based on the received information and the information on the sensitivity of the focus lens stored in the lens unit, the correction amount to correct the image plane movement during the insertion of the optical filter to drive the focus lens. As a result, even in many types of lens units having different optical characteristics, defocusing caused by the insertion of the ND filer can be corrected to capture a good in-focus image.

Figure 4:
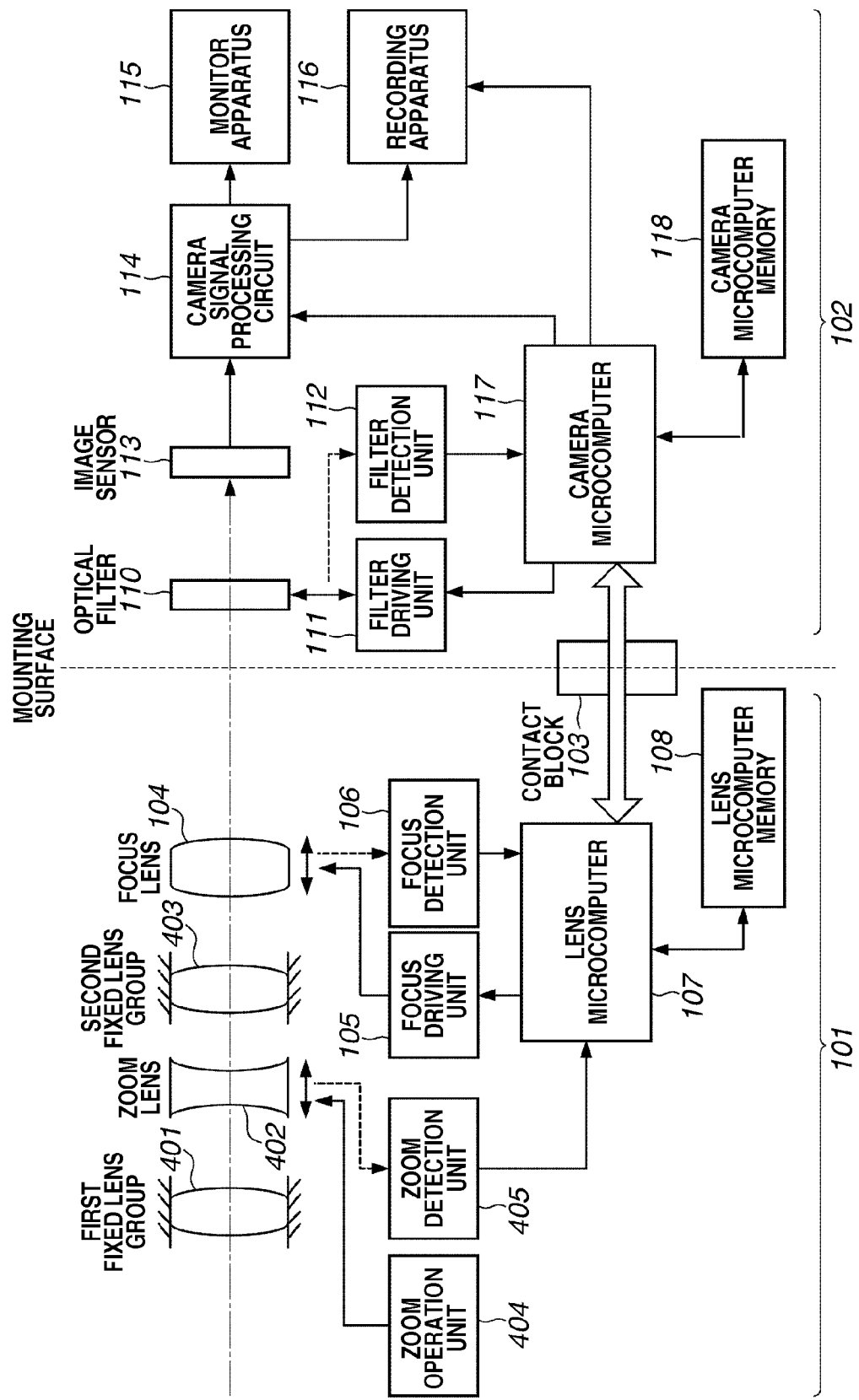
FIG. 4 is a block diagram illustrating an example configuration of an imaging apparatus according to a second exemplary embodiment of the present invention.

FIG. 4 is a block diagram illustrating a configuration of an interchangeable-lens type camera (imaging apparatus) according to a second exemplary embodiment of the present invention. In the second exemplary embodiment, in a rear focus type lens unit, electronic cam locus data is corrected based on information on an image plane movement amount received from a camera body to execute lens control.

In FIG. 4, components 101 to 108 are similar to those of the first exemplary embodiment of the present invention illustrated in FIG. 1, and thus description thereof is omitted. An optical system of the lens unit includes a first fixed lens group 401, a zoom lens 402 for zooming, a second fixed lens group 403, and a focus lens 104. A zoom operation unit 404 executes zooming by moving the zoom lens 402 such as a zoom ring operated by an operator. In this case, a configuration where the zoom lens is directly moved via a cam mechanism by an operator's manual operation or a power-zoom configuration where the operator operates a switch or an electronic ring and the zoom lens is moved by a driving unit such as a motor according to its operation amount can be employed. A zoom detection unit 405 is a sensor for detecting a zoom lens position, and a detected signal is input to a lens microcomputer 107.

Figure 5:
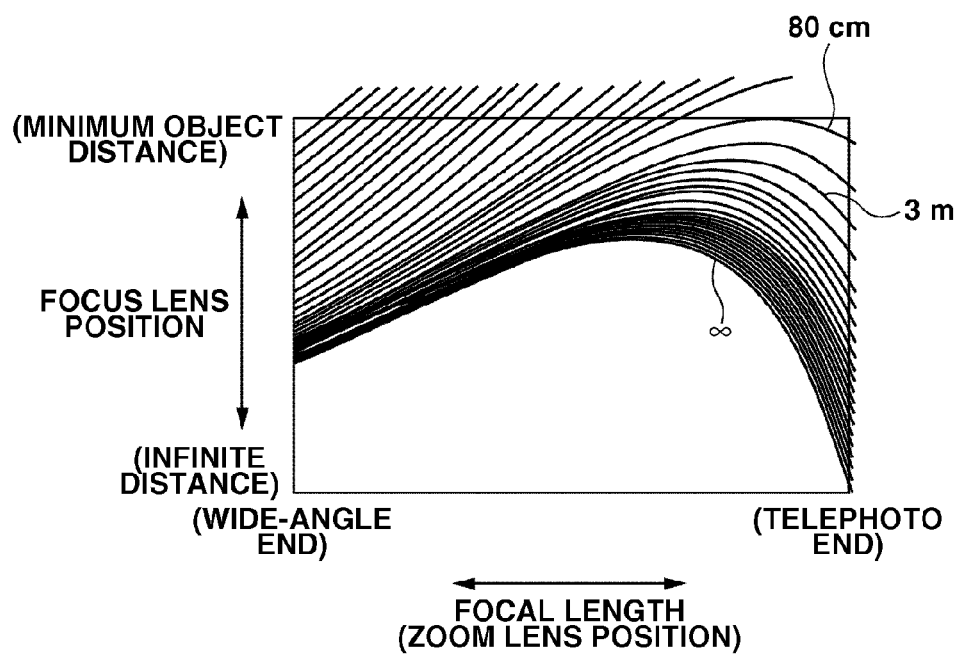
FIG. 5 illustrates an example of an electronic cam locus in a rear focus lens system.

In the rear focus type lens unit, when a focal length (the position of the zoom lens 402) is changed in each object distance, if the position of the focus lens 104 for focusing an object image on a captured image plane is continuously plotted, a result is as illustrated in FIG. 5. In the rear focus type lens unit, information on a plurality of loci (electronic cam loci) or its corresponding information (information indicating loci themselves or function where lens position is a variable) is stored, and a locus is selected based on positions of the focus lens 104 and the zoom lens 402. An in-focus state is maintained during zooming by executing zooming while tracing the selected locus. Specifically, the lens microcomputer 107 calculates a corresponding position of the focus lens 104 from a position of the zoom lens 402 at a certain time and a locus selected at this time by using the stored electronic cam locus data, and moves the focus lens 104 to the calculated position. The lens microcomputer 107 controls the lens to trace the electric cam locus by sequentially executing this processing during zooming.

However, when the image plane moves due to insertion of an ND filter on an optical path, the in-focus state cannot be maintained during zooming unless the focus lens position of the electronic cam locus illustrated in FIG. 5 is shifted by an amount equal to the movement of the image plane to be controlled. Thus, hereinafter, correction processing of defocusing caused by the insertion or retraction of the ND filter in the rear focus lens is described.

Processing in a camera body 102 is similar to that of the first exemplary embodiment, and thus description thereof is omitted. Hereinafter, processing at the lens microcomputer 107 is described referring to the flowchart of FIG. 6.

Figure 6:
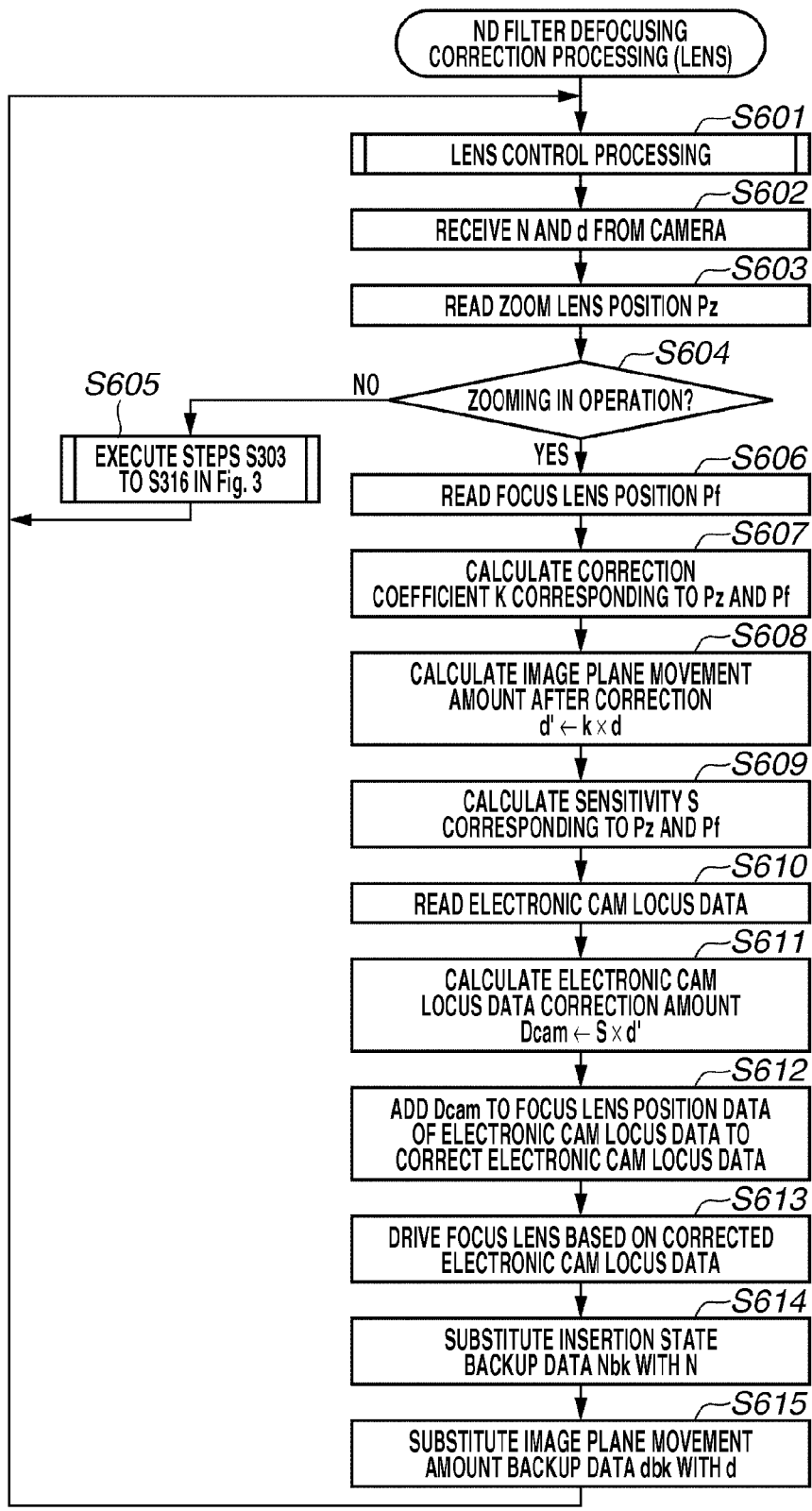
FIG. 6 is a flowchart illustrating an example defocusing correction processing in a lens unit according to the second exemplary embodiment.

In FIG. 6, steps S601 and S602 are similar to steps S301 and S302 illustrated in FIG. 3, and thus description thereof is omitted. In step S603, the lens microcomputer 107 reads a zoom lens position Pz detected by a zoom detection unit 405.

In step S604, the lens microcomputer 107 determines whether zooming is in operation by the operator. This can be determined based on whether the zoom lens position Pz is different from that detected last time or by using information on whether a zoom driving motor is in driving in the case of a power-zoom configuration. When zooming is not in operation (NO in step S604), the processing proceeds to step S605. This processing is similar to that of steps S303 to S316 in the first exemplary embodiment illustrated in FIG. 3, and the lens microcomputer 107 drives the focus lens to correct defocusing caused by the insertion of the ND filter. After the end, the processing returns to step S601. On the other hand, when zooming is in operation (YES in step S604), the processing proceeds to step S606, and the lens microcomputer 107 executes correction processing of electronic cam locus data corresponding to the defocusing caused by the insertion of the ND filter.

Steps S606 to S609 are similar to steps S307 to S310 illustrated in FIG. 3, and thus description thereof is omitted. In the present exemplary embodiment, movable lenses are both a focus lens 104 and a zoom lens 403, and hence in steps S607 and S609, the lens microcomputer 107 calculates a correction coefficient K and a sensitivity S corresponding to both of the focus lens position Pf and the zoom lens position Pz. In step S309, the image plane movement amount dbk' is calculated. However, since the image plane movement amount dbk' is not used in the processing below, the calculation of the image plane movement amount dbk' is omitted in step S608.

Then, in step S610, the lens microcomputer 107 reads the electronic cam locus data stored in a lens microcomputer memory 108. For the electronic cam locus data, a locus in a referenced state where no filter is inserted is stored. In step S611, the lens microcomputer 107 calculates a correction amount Dcam to correct shifting of the electronic cam locus during the filter insertion. An image plane movement amount on a captured image plane by the filter insertion is equivalent to an image plane movement amount "d'" after correction calculated in step S608. Electronic cam locus data in the filter inserted state can accordingly be acquired by executing correction to shift the focus lens position by S×d' with respect to the electronic cam locus data in the reference state. In other words, Dcam=S×d' is set. In step S612, the lens microcomputer 107 then adds the correction amount Dcam to the electronic cam locus data read in step S610 to acquire corrected electronic cam locus data.

In step S613, the lens microcomputer 107 controls driving of the focus lens during zooming based on the corrected electronic cam locus data acquired in step S612. Various well-known methods have been proposed for driving control of the focus lens based on the electronic cam locus data in the rear focus type lens, and thus detailed description is omitted.

In steps S614 and S615, as in the case of steps S315 and S316, the lens microcomputer 107 substitutes the backup data Nbk and dbk of the filter insertion state N and the image plane movement amount "d" with the received data N and "d". This completes the correction processing of the defocusing caused by the insertion of the ND filter in the rear focus type lens. Then, the processing returns to step S601 to be repeated.

According to the present exemplary embodiment, even in the rear focus type lens unit that controls the zoom lens and the focus lens in association with each other based on the electronic cam locus data, the lens microcomputer executes lens control by correcting the electronic cam locus data based on the information of the image plane movement amount received from the camera body and the information of the sensitivity of the focus lens stored in the lens unit. As a result, even when the insertion state of the optical filter such as the ND filter included in the camera body changes, an in-focus state can be maintained during zooming, and a moving image of a good in-focus state can be captured.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-126538 filed Jun. 6, 2011, which is hereby incorporated by reference herein in its entirety.

What is claimed is:

1. An imaging apparatus on which a lens unit, having a photographic optical system including a focus lens and a storage unit configured to previously store first information regarding a correction value, for each position of the focus lens, for correcting a movement amount of an image forming position of an object image in response to changing an insertion state of an optical filter with respect to reference position of the focus lens and capable of controlling driving of the focus lens based on information on the movement amount of the image forming position of an object image received from the imaging apparatus and the correction value obtained from the first information corresponding to the position of the focus lens, and wherein the lens unit is detachably mountable, the imaging apparatus comprising:
   an optical filter configured to be inserted or retracted on an optical path through the photographic optical system;
   a detection unit configured to detect an insertion state of the optical filter;
   a calculation unit configured to calculate the movement amount of the image forming position of the object image with respect to the reference position of the focus lens corresponding to the insertion state of the optical filter detected by the detection unit; and
   a control unit configured to transmit, to the lens unit, information on the movement amount of the image forming position of the object image with respect to the reference position of the focus lens calculated by the calculation unit and information on the insertion state of the optical filter detected by the detection unit.

2. The imaging apparatus according to claim 1, wherein the optical filter is an ND filter or an infrared cut filter.

3. A lens unit detachably mountable on an imaging apparatus having an optical filter which is inserted or retracted on an optical path through a photographic optical system, the lens unit comprising:
   the photographic optical system including a focus lens;
   a control unit configured to receive, from the imaging apparatus, information on an insertion state of the optical filter and information on a movement amount of an image forming position of an object image with respect to a reference position of the focus lens; and
   a storage unit configured to previously store first information regarding a correction value, for each position of the focus lens, for correcting the movement amount of the image forming position of the object image in response to changing the insertion state of the optical filter with respect to the reference position of the focus lens,
   wherein when the control unit determines a change of the insertion state of the optical filter based on the received information, the control unit is configured to determine the movement amount of the focus lens based on the received information on the movement amount of the image forming position of the object image with respect to the reference position of the focus lens and the correction value obtained from the first information corresponding to the position of the focus lens, and to control driving of the focus lens.

4. The lens unit according to claim 3,
   wherein the storage unit is configured to store second information for converting the movement amount of the image forming position of the object image into the movement amount of the focus lens for each position of the focus lens; and
   wherein the lens control unit is configured to determine the movement amount of the focus lens based on the received information on the movement amount of the image forming position of the object image with respect to the reference position of the focus lens and the correction value obtained from the first information and the second information corresponding to the position of the focus lens, to control driving of the focus lens.

5. The lens unit according to claim 3,
   wherein the storage unit is configured to store the information on the movement amount of the image forming position of the object image with respect to the reference position of the focus lens received from the imaging apparatus; and
   wherein the lens control unit is configured to determine, when a difference between a movement amount of the image forming position of the object image with respect to the reference position of the focus lens based on new information received from the imaging apparatus and the movement amount of the image forming position of the object image based with respect to the reference position of the focus lens on the information stored in the storage unit exceeds a predetermined value, the movement amount of the focus lens based on the new received information on the movement amount of the image forming position of the object image with respect to the reference position of the focus lens and the correction value obtained from the first information corresponding to the position of the focus lens, to control driving of the focus lens.

6. The lens unit according to claim 3, wherein the correction value indicates a correction coefficient for converting the movement amount of the image forming position of the object image with respect to the reference position of the focus lens into a real movement amount of the image forming position of the object image, and
   wherein the control unit is configured to determine the movement amount of the focus lens based on the real movement amount of the image forming position of the object image.

7. A lens unit detachably mountable on an imaging apparatus having an optical filter which is inserted or retracted on an optical path through a photographic optical system, the lens unit comprising:
   the photographic optical system including a focus lens and a zoom lens;
   a control unit configured to receive, from the imaging apparatus, information on an insertion state of the optical filter and information on a movement amount of an image forming position of the object image with respect to reference positions of the focus lens and the zoom lens; and
   a storage unit configured to previously store first information regarding the zoom lens and a correction value, for each position of the focus lens and each position of the zoom lens, for correcting the movement amount of the image forming position of the object image in response to changing the insertion state of the optical filter with respect to the reference positions of the focus lens and the zoom lens,
   wherein when the control unit determines a change of the insertion state of the optical filter based on the received information, the control unit is configured to determine the movement amount of the focus lens based on the received information on the movement amount of the image forming position of the object image with respect to the reference positions of the focus lens and the zoom lens and the correction value obtained from the first information corresponding to the position of the focus lens and the zoom lens, and to control driving of the focus lens.

8. The lens unit according to claim 7,
   wherein the storage unit is configured to store second information for converting the movement amount of the image forming position of the object image into the movement amount of the focus lens for each position of the focus lens and each position of the zoom lens; and
   wherein the lens control unit is configured to determine the movement amount of the focus lens based on the received information on the movement amount of the image forming position of the object image with respect to the reference position of the focus lens and the zoom lens and the correction value obtained from the first information and the second information corresponding to the position of the focus lens and the position of the zoom lens, to control driving of the focus lens.

9. The lens unit according to claim 7,
   wherein the storage unit is configured to store the information on the movement amount of the image forming position of the object image with respect to the reference position of the focus lens and the zoom lens received from the imaging apparatus; and
   wherein the lens control unit is configured to determine, when a difference between a movement amount of the image forming position of the object image with respect to the reference position of the focus lens and the zoom lens based on new information received from the imaging apparatus and the movement amount of the image forming position of the object image with respect to the reference position of the focus lens and the zoom lens based on the information stored in the storage unit exceeds a predetermined value, the movement amount of the focus lens based on the new received information on the movement amount of the image forming position of the object image with respect to the reference position of the focus lens and the zoom lens and the correction value obtained from the first information corresponding to the position of the focus lens and the position of the zoom lens, to control driving of the focus lens.

10. The lens unit according to claim 7, wherein the correction value indicates a correction coefficient for converting the movement amount of the image forming position of the object image with respect to the reference position of the focus lens and the zoom lens into a real movement amount of the image forming position of the object image, and
    wherein the control unit is configured to determine the movement amount of the focus lens based on the real movement amount of the image forming position of the object image.

11. A method for controlling an imaging apparatus on which a lens unit, having a photographic optical system including a focus lens and a storage unit configured to previously store first information regarding a correction value, for each position of the focus lens, for correcting a movement amount of an image in response to changing an insertion state of an optical filter forming position of an object image with respect to a reference position of the focus lens and capable of controlling driving of the focus lens based on information on a movement amount of an image forming position of an object image received from the imaging apparatus the correction value obtained from and the first information corresponding to the position of the focus lens, and wherein the lens unit is detachably mountable, the imaging apparatus having an optical filter configured to be inserted or retracted on an optical path through the photographic optical system, the method comprising:
    detecting an insertion state of the optical filter;
    calculating the movement amount of the image forming position of the object image with respect to the reference position of the focus lens corresponding to the detected insertion state of the optical filter; and
    transmitting, to the lens unit, information on the calculated movement amount of the image forming position of the object image with respect to the reference position of the focus lens and information on the detected insertion state of the optical filter.

12. A method for controlling a lens unit detachably mountable on an imaging apparatus having an optical filter which is inserted or retracted through an optical path of a photographic optical system, the lens unit having the photographic optical system including a focus lens and a storage unit configured to previously store first information regarding a correction value, for each position of the focus lens, for correcting a movement amount of an image forming position of an object image in response to changing an insertion state of the optical filter with respect to reference positions of the focus lens and the zoom lens, the method comprising:
    receiving, from the imaging apparatus, information on an insertion state of the optical filter and information on the movement amount of the image forming position of the object image with respect to reference positions of the focus lens and the zoom lens; and
    determining, when a change of the insertion state of the optical filter is determined based on the received information, the movement amount of the focus lens based on the received information on the movement amount of the image forming position of the object image with respect to reference positions of the focus lens and the zoom lens and the correction value obtained from the first information corresponding to the position of the focus lens, and controlling driving of the focus lens.

13. A method for controlling a lens unit detachably mountable on an imaging apparatus having an optical filter which is inserted or retracted through an optical path of a photographic optical system, the lens unit having the photographic optical system including a focus lens and a zoom lens and a storage unit configured to previously store first information regarding a correction, for each position of the focus lens and each position of the zoom lens, value for correcting a movement amount of an image forming position of an object image in responds to changing an insertion state of the optical filter with respect to reference positions of the focus lens and the zoom lens, the method comprising:
  receiving, from the imaging apparatus, information on an insertion state of the optical filter and information on the movement amount of the image forming position of the object image with respect to reference positions of the focus lens and the zoom lens; and
  determining, when a change of the insertion state of the optical filter is determined based on the received information, the movement amount of the focus lens based on the received information on the movement amount of the image forming position of the object image with respect to reference positions of the focus lens and the zoom lens and the correction value obtained from the first information corresponding to the positions of the focus lens and the zoom lens, and controlling driving of the focus lens.

14. The lens unit according to claim 3, wherein the control unit corrects the movement amount of the image forming position of the object image with respect to the reference position of the focus lens by using the correction value obtained from the first information corresponding to the position of the focus lens, and determines the movement amount of the focus lens based on the corrected movement amount of the image forming position of the object image.

15. The lens unit according to claim 7, wherein the control unit corrects the movement amount of the image forming position of the object image with respect to the reference positions of the focus lens and the zoom lens by using the correction value obtained from the first information corresponding to the positions of the focus lens and the zoom lens, and determines the movement amount of the focus lens based on the corrected movement amount of the image forming position of the object image.

* * * * *